Aug. 20, 1929.　　M. H. SHOENBERG ET AL　　1,725,308
COMBINED CORD REEL
Filed Sept. 3, 1924　　2 Sheets-Sheet 1
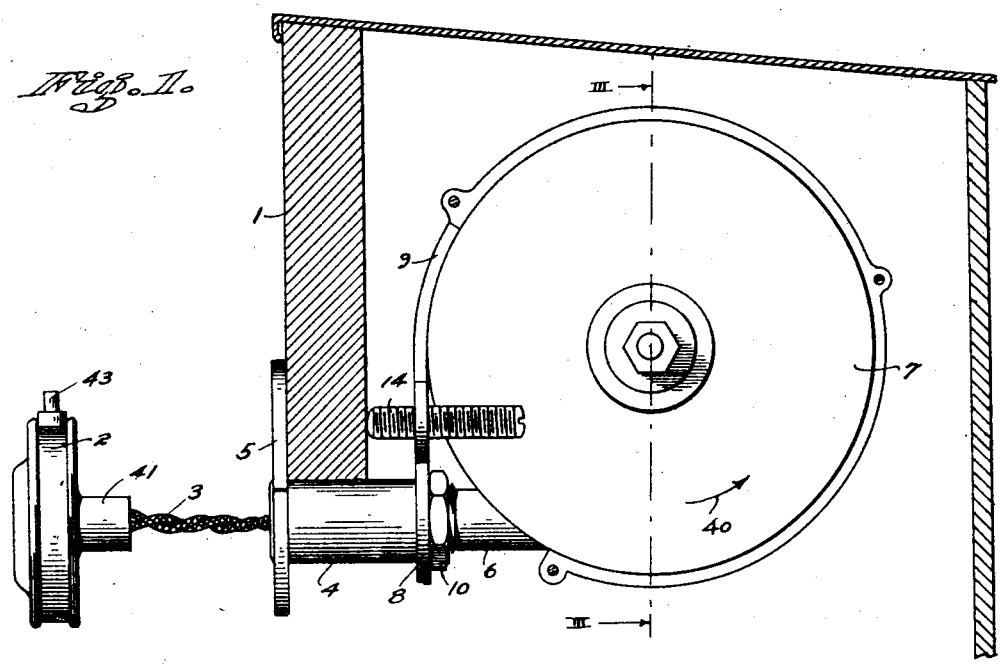
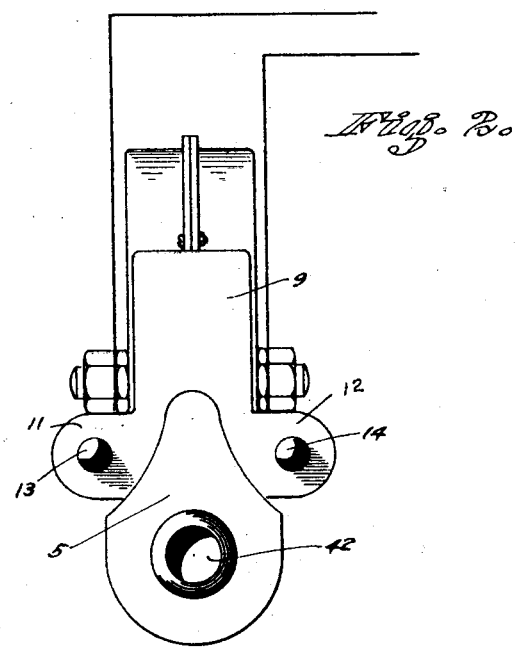
INVENTOR

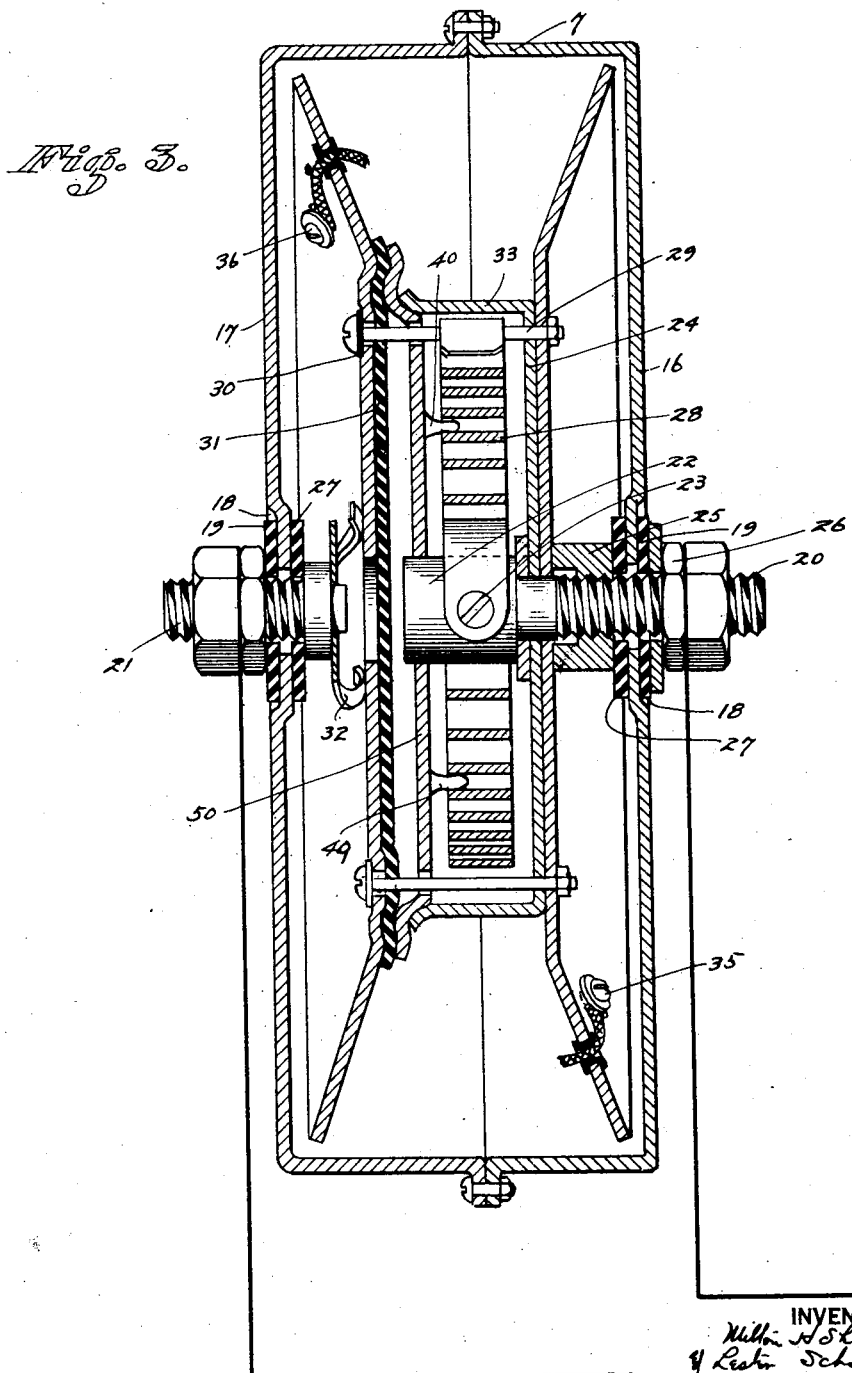

Patented Aug. 20, 1929.

1,725,308

UNITED STATES PATENT OFFICE.

MILTON H. SHOENBERG AND LESTER SCHON, OF SAN FRANCISCO, CALIFORNIA; SAID SCHON ASSIGNOR TO SAID SHOENBERG.

COMBINED CORD REEL.

Application filed September 3, 1924. Serial No. 735,627.

Our invention has for its object a device adapted to retain a spring tension on a cord and adapted to wind the cord when released on a reel within a casing.

A further object is a device of the character described in combination with electric circuit connections and a flexible cord whereby the electric circuit may be transmitted over stationary connections thru a reel, and thus to electric terminal connections to energize an accessory device as for example a cigar lighter, lamp or the like.

Other objects will appear from the drawings and specifications which follow.

These objects we attain by constructing the reel substantially as shown and described in the accompanying drawing and specifications.

In the drawing, Fig. 1 is a cross section thru the instrument board of a conventional automobile to which my reel and cigar lighter are affixed.

Fig. 2 is a view of the reel and bracket of Fig. 1 at right angles thereto, but removed from the instrument board and with the cigar lighter removed therefrom.

Fig. 3 is a cross section of the reel and casing of Fig. 1 on the line 111—111 thereof.

Thruout the figures, similar numerals refer to identical parts.

An instrument board of a conventional automobile is indicated by the numeral 1, and a cigar lighter of the general type set forth in our co-pending application No. 660,514 filed September 1, 1923, is shown by the numeral 2. The electrical connections for the lighter are indicated by the cord 3, passing thru the spool member 4, on one end of which spool is formed the flange 5, and the opposite end is extended thru the thimble 6, in a tangential direction into the casing 7. A bracket 8 is spot welded or otherwise affixed to the casing at 9, and the spool 4, and tube 6, rigidly affixed thereto by the nut 10.

Extending from each side of this bracket are ears 11, 12, having set screws 13, 14, adapted to bear against the board 1, or other fixture, to which it is desired to affix my reel and cord. The casing is formed primarily of two cover plates, 16, 17, having depressed central portions 18—18, adapted to center the insulated washers 19—19, the said depressed portions 18—18 being formed with larger holes than the central holes thru the washers 19, 27, and whereby the conducting rods 20, 21, are centrally held within the washers and therefore centrally within the recesses 18, leaving a clear air space between the sides 16, 17, and the conductors 20, 21, respectively for insulation.

A conductor 20 is provided with a cylindrical head 22, to which the spring end 23 is affixed. The conductor 20 is rigidly held with the casing side 16 by the nuts 25, 26, with the insulated washers 19 and 27 clamped therebetween. The conductor 21 is mounted in a similar manner on the side 17, or one of the conductors may be grounded to the casing, where a grounded circuit is employed.

It will now be seen that the reel side 24 may rotate freely on the conductor 20, and that current will be communicated thru 20 and the spring end 23, and the coil spring 28, the opposite end of which is affixed to the reel as by screw 29, whereby the side 24 is energized from the connection 20.

The other side of the reel shown at 30 is insulated from 24 by the plate 31, and the two sides may be held together by passing screws as 29 thru insulating bushings, or insulating plates fitted in recesses similar to that above described between the side 16 and the conductor 20, or in other well known ways.

The conductor 21 is mounted in but insulated from the casing side 17 in the same manner as the conductor 20 is mounted and insulated with respect to the side 16, with the difference, however, that current is conveyed from 21 thru the brush 32 to the plate 30. The side 24 and drum 33 spot welded thereto and forming the body of the reel will therefore be energized from the conductor 20 and the opposite side 30 of the reel will be energized from the conductor 21. Energizing electrical connections are connected up with the conductors 20, 21 in a conventional way, as from the automobile storage battery.

On one side of the reel at 35 is affixed one leg of the cord, the opposite leg of the cord being connected at 36 to the side 30. The conventional cord 3 therefore provides the desired conductivity to the lighter or other terminal device from the source of electrical energy, as the storage battery of the automobile. The spring 28 is initially wound to produce a pull on the cord 3, by the reel tending to wind under the said spring tension in the direction of the arrow 40, and this tension is to be sufficient to draw the lighter or other fixture 2, against the flange 5. At such time the thimble 41 engages freely in the hole 42.

The device is used by grasping the lighter and drawing it outwards to the cigar to be lighted, thus pulling the cord 3 thru the thimble 6 and the spool 4, and unwinding the desired length of cord from the reel, which under the said pull now rotates in the direction opposite to the arrow 40. The push button 43 is depressed, energizing the lighter, and after the lighter has been used, it is released, and by the tension of the spring 28 the reel is wound in the direction of the arrow 40, the cord 3 pulled thru the spool 4 and thimble 6 until the thimble 41 enters the hole 42.

It will be noted that the lighter is never energized unless the push button 43 is depressed, and this may be done at any time with any position of the lighter with respect to the reel, the cord 3 being always in connection with the source of electrical energy thru the reel and the conductors.

The reel plate 50 has internally projecting lugs 49, 49 which engage the spirals of the spring 28 and maintain the said spiral central during its operation.

Reference is herein made to our co-pending application Serial No. 673,261 filed November 7th, 1923, wherein other matter herein shown is separately claimed.

We claim:

1. A cord reel in combination with a bracket comprising a front plate and a rear member and a tube connecting the plate and the member, a casing for said reel fixed with the rear member a plurality of set screws on the member adapted to clamp against the plate positioned above the tube, and a cord, said cord passing through said tube and fixed to said reel.

2. A cord reel in combination with a bracket comprising a front plate and a rear member and a tube connecting the plate and the member, a casing for said reel fixed with the rear member a plurality of set screws on the member adapted to clamp against the plate positioned above the tube, and a cord, said cord passing through said tube and fixed to said reel, electric energizing connections insulated from but mounted on said casing and conducting means from said connections to said cord.

3. A reel for a flexible conducting cord, comprising a right and a left side plate insulated from each other and a drum therebetween, an enclosing casing having conductors on each side insulated from said casing, said reel rotatably mounted on one of said conductors and a brush connection between the other conductor and the insulated portion of the reel.

4. The combination set forth in claim 3 and a spiral spring between the said axle and the reel and an intermediate plate fixed with one of said side plates and having lugs engaging the spirals of said spring.

5. The combination set forth in claim 3 and a spiral spring between the said axle and the reel and an intermediate plate fixed with one of said side plates and having lugs engaging the spirals of said spring and a hole through each plate and a terminal connection on the outside of each plate for attaching one of the cord conductors thereto.

6. A device of the character described comprising a casing having a tubular outlet, a reel and conductor mounted in said casing, said conductor passing through said outlet, a U-shaped clamping frame secured to said casing, said frame having a front flange adapted to engage the front of the lower edge of an instrument board and a rear flange in rear of the front flange and a screw passing through the rear flange and adapted to engage and grip the lower rear edge of the instrument board above said outlet.

7. A reel casing having a tubular extension, a clamp bracket removably mounted on said tube and two set screws passing forwardly through the rear of said bracket one at each side of said casing for engaging the rear edge of an instrument board.

8. A casing containing a reel, a tubular extension secured to said casing, a power consuming device cooperating with said tubular extension, a conductor cord connecting said device and said reel and passing through said tubular extension when said device is drawn out, a U-shaped clamp mounted on said tubular extension and adapted to engage the lower edge of an instrument board, means for holding said clamp on said extension and a set screw passing through one arm of said clamp from the rear and adapted to engage the rear of the instrument board.

9. In combination with a cord reel, a casing within which said cord reel is rotatably mounted, a bracket attached to the front portion of said casing and adapted to support said casing, said bracket provided with other means adapted to fix the bracket to an instrument board of a vehicle or the like, and a passage through the lower portion of said bracket and spaced below said other means and below said instrument board and through which passage the cord passes to said reel.

10. In combination with a cord reel, a casing within which said reel is rotatably mounted, a bracket on the front of said casing and provided with gripping means adapted to embrace the edge of a board or the like and a passage through the front of said casing below said gripping means through which said cord is reeved.

MILTON H. SHOENBERG.
LESTER SCHON.